United States Patent
Langhammer

(10) Patent No.: US 8,539,016 B1
(45) Date of Patent: Sep. 17, 2013

(54) QR DECOMPOSITION IN AN INTEGRATED CIRCUIT DEVICE

(75) Inventor: Martin Langhammer, Alderbury (GB)

(73) Assignee: Altera Corporation, San Jose, CA (US)

( * ) Notice: Subject to any disclaimer, the term of this patent is extended or adjusted under 35 U.S.C. 154(b) by 610 days.

(21) Appl. No.: 12/703,146

(22) Filed: Feb. 9, 2010

(51) Int. Cl.
*G06F 7/32* (2006.01)

(52) U.S. Cl.
USPC ............................................ 708/520

(58) Field of Classification Search
USPC ............................................ 708/520
See application file for complete search history.

(56) References Cited

U.S. PATENT DOCUMENTS

| | | | |
|---|---|---|---|
| 3,473,160 A | 10/1969 | Wahlstrom | |
| 4,156,927 A | 5/1979 | McElroy et al. | |
| 4,179,746 A | 12/1979 | Tubbs | |
| 4,212,076 A | 7/1980 | Conners | |
| 4,215,406 A | 7/1980 | Gomola et al. | |
| 4,215,407 A | 7/1980 | Gomola et al. | |
| 4,422,155 A | 12/1983 | Amir et al. | |
| 4,484,259 A | 11/1984 | Palmer et al. | |
| 4,521,907 A | 6/1985 | Amir et al. | |
| 4,575,812 A | 3/1986 | Kloker et al. | |
| 4,597,053 A | 6/1986 | Chamberlin | |
| 4,616,330 A | 10/1986 | Betz | |
| 4,623,961 A | 11/1986 | Mackiewicz | |
| 4,682,302 A | 7/1987 | Williams | |
| 4,718,057 A | 1/1988 | Venkitakrishnan et al. | |
| 4,727,508 A | 2/1988 | Williams | |
| 4,736,335 A | 4/1988 | Barkan | |
| 4,777,614 A | 10/1988 | Ward | |
| 4,791,590 A | 12/1988 | Ku et al. | |
| 4,799,004 A | 1/1989 | Mori | |
| 4,823,295 A | 4/1989 | Mader | |
| 4,839,847 A | 6/1989 | Laprade | |
| 4,871,930 A | 10/1989 | Wong et al. | |

(Continued)

FOREIGN PATENT DOCUMENTS

| | | |
|---|---|---|
| EP | 0 158 430 | 10/1985 |
| EP | 0 380 456 | 8/1990 |

(Continued)

OTHER PUBLICATIONS

Altera Corporation, "FIR Compiler: MegaCore® Function User Guide," version 3.3.0, rev. 1, pp. 3 11 through 3 15 (Oct. 2005).

(Continued)

*Primary Examiner* — Tan V. Mai
(74) *Attorney, Agent, or Firm* — Ropes & Gray LLP; Jeffrey H. Ingerman

(57) ABSTRACT

Circuitry speeds up the QR decomposition of a matrix. The circuitry can be provided in a fixed logic device, or can be configured into a programmable integrated circuit device such as a programmable logic device. This implementation performs Gram-Schmidt orthogonalization with no dependencies between iterations. QR decomposition of a matrix can be performed by processing entire columns at once as a vector operation. Data dependencies within and between matrix columns are removed, as later functions dependent on an earlier result may be generated from partial results somewhere in the datapath, rather than from an earlier completed result. Different passes through the matrix are timed so that different computations requiring the same functional units arrive at different time slots. After the Q matrix has been calculated, the R matrix may be calculated from the Q matrix by taking its transpose and multiplying the transpose by the original input matrix.

29 Claims, 3 Drawing Sheets

(56) References Cited

U.S. PATENT DOCUMENTS

| | | |
|---|---|---|
| 4,912,345 A | 3/1990 | Steele et al. |
| 4,918,637 A | 4/1990 | Morton |
| 4,967,160 A | 10/1990 | Quievy et al. |
| 4,982,354 A | 1/1991 | Takeuchi et al. |
| 4,991,010 A | 2/1991 | Hailey et al. |
| 4,994,997 A | 2/1991 | Martin et al. |
| 5,073,863 A | 12/1991 | Zhang |
| 5,081,604 A | 1/1992 | Tanaka |
| 5,122,685 A | 6/1992 | Chan et al. |
| 5,128,559 A | 7/1992 | Steele |
| 5,175,702 A | 12/1992 | Beraud et al. |
| 5,208,491 A | 5/1993 | Ebeling et al. |
| RE34,363 E | 8/1993 | Freeman |
| 5,267,187 A | 11/1993 | Hsieh et al. |
| 5,296,759 A | 3/1994 | Sutherland et al. |
| 5,338,983 A | 8/1994 | Agarwala |
| 5,339,263 A | 8/1994 | White |
| 5,349,250 A | 9/1994 | New |
| 5,357,152 A | 10/1994 | Jennings, III et al. |
| 5,371,422 A | 12/1994 | Patel et al. |
| 5,375,079 A | 12/1994 | Uramoto et al. |
| 5,381,357 A | 1/1995 | Wedgwood et al. |
| 5,404,324 A | 4/1995 | Colon-Bonet |
| 5,424,589 A | 6/1995 | Dobbelaere et al. |
| 5,446,651 A | 8/1995 | Moyse et al. |
| 5,451,948 A | 9/1995 | Jekel |
| 5,452,231 A | 9/1995 | Butts et al. |
| 5,452,375 A | 9/1995 | Rousseau et al. |
| 5,457,644 A | 10/1995 | McCollum |
| 5,465,226 A | 11/1995 | Goto |
| 5,465,375 A | 11/1995 | Thepaut et al. |
| 5,483,178 A | 1/1996 | Costello et al. |
| 5,497,498 A | 3/1996 | Taylor |
| 5,500,812 A | 3/1996 | Saishi et al. |
| 5,500,828 A | 3/1996 | Doddington et al. |
| 5,523,963 A | 6/1996 | Hsieh et al. |
| 5,528,550 A | 6/1996 | Pawate et al. |
| 5,537,601 A | 7/1996 | Kimura et al. |
| 5,546,018 A | 8/1996 | New et al. |
| 5,550,993 A | 8/1996 | Ehlig et al. |
| 5,559,450 A | 9/1996 | Ngai et al. |
| 5,563,526 A | 10/1996 | Hastings et al. |
| 5,563,819 A | 10/1996 | Nelson |
| 5,570,039 A | 10/1996 | Oswald et al. |
| 5,570,040 A | 10/1996 | Lytle et al. |
| 5,572,148 A | 11/1996 | Lytle et al. |
| 5,581,501 A | 12/1996 | Sansbury et al. |
| 5,590,350 A | 12/1996 | Guttag et al. |
| 5,594,366 A | 1/1997 | Khong et al. |
| 5,594,912 A | 1/1997 | Brueckmann et al. |
| 5,596,763 A | 1/1997 | Guttag et al. |
| 5,606,266 A | 2/1997 | Pedersen |
| 5,617,058 A | 4/1997 | Adrian et al. |
| 5,631,848 A | 5/1997 | Laczko et al. |
| 5,633,601 A | 5/1997 | Nagaraj |
| 5,636,150 A | 6/1997 | Okamoto |
| 5,636,368 A | 6/1997 | Harrison et al. |
| 5,640,578 A | 6/1997 | Balmer et al. |
| 5,644,519 A | 7/1997 | Yatim |
| 5,644,522 A | 7/1997 | Moyse et al. |
| 5,646,545 A | 7/1997 | Trimberger et al. |
| 5,646,875 A | 7/1997 | Taborn et al. |
| 5,648,732 A | 7/1997 | Duncan |
| 5,652,903 A | 7/1997 | Weng et al. |
| 5,655,069 A | 8/1997 | Ogawara et al. |
| 5,664,192 A | 9/1997 | Lloyd et al. |
| 5,689,195 A | 11/1997 | Cliff et al. |
| 5,696,708 A | 12/1997 | Leung |
| 5,729,495 A | 3/1998 | Madurawe |
| 5,740,404 A | 4/1998 | Baji |
| 5,744,980 A | 4/1998 | McGowan et al. |
| 5,744,991 A | 4/1998 | Jefferson et al. |
| 5,754,459 A | 5/1998 | Telikepalli |
| 5,761,483 A | 6/1998 | Trimberger |
| 5,764,555 A | 6/1998 | McPherson et al. |
| 5,768,613 A | 6/1998 | Asghar |
| 5,771,186 A | 6/1998 | Kodali et al. |
| 5,777,912 A | 7/1998 | Leung et al. |
| 5,784,636 A | 7/1998 | Rupp |
| 5,790,446 A | 8/1998 | Yu et al. |
| 5,794,067 A | 8/1998 | Kadowaki |
| 5,801,546 A | 9/1998 | Pierce et al. |
| 5,805,477 A | 9/1998 | Perner |
| 5,805,913 A | 9/1998 | Guttag et al. |
| 5,808,926 A | 9/1998 | Gorshtein et al. |
| 5,812,479 A | 9/1998 | Cliff et al. |
| 5,812,562 A | 9/1998 | Baeg |
| 5,815,422 A | 9/1998 | Dockser |
| 5,821,776 A | 10/1998 | McGowan |
| 5,825,202 A | 10/1998 | Tavana et al. |
| 5,838,165 A | 11/1998 | Chatter |
| 5,841,684 A | 11/1998 | Dockser |
| 5,847,579 A | 12/1998 | Trimberger |
| 5,847,978 A | 12/1998 | Ogura et al. |
| 5,847,981 A | 12/1998 | Kelley et al. |
| 5,859,878 A | 1/1999 | Phillips et al. |
| 5,869,979 A | 2/1999 | Bocchino |
| 5,872,380 A | 2/1999 | Rostoker et al. |
| 5,874,834 A | 2/1999 | New |
| 5,878,250 A | 3/1999 | LeBlanc |
| 5,880,981 A | 3/1999 | Kojima et al. |
| 5,892,962 A | 4/1999 | Cloutier |
| 5,894,228 A | 4/1999 | Reddy et al. |
| 5,898,602 A | 4/1999 | Rothman et al. |
| 5,931,898 A | 8/1999 | Khoury |
| 5,942,914 A | 8/1999 | Reddy et al. |
| 5,944,774 A | 8/1999 | Dent |
| 5,949,710 A | 9/1999 | Pass et al. |
| 5,951,673 A | 9/1999 | Miyata |
| 5,956,265 A | 9/1999 | Lewis |
| 5,959,871 A | 9/1999 | Pierzchala et al. |
| 5,960,193 A | 9/1999 | Guttag et al. |
| 5,961,635 A | 10/1999 | Guttag et al. |
| 5,963,048 A | 10/1999 | Harrison et al. |
| 5,963,050 A | 10/1999 | Young et al. |
| 5,968,196 A | 10/1999 | Ramamurthy et al. |
| 5,970,254 A | 10/1999 | Cooke et al. |
| 5,978,260 A | 11/1999 | Trimberger et al. |
| 5,982,195 A | 11/1999 | Cliff et al. |
| 5,986,465 A | 11/1999 | Mendel |
| 5,991,788 A | 11/1999 | Mintzer |
| 5,991,898 A | 11/1999 | Rajski et al. |
| 5,995,748 A | 11/1999 | Guttag et al. |
| 5,999,015 A | 12/1999 | Cliff et al. |
| 5,999,990 A | 12/1999 | Sharrit et al. |
| 6,005,806 A | 12/1999 | Madurawe et al. |
| 6,006,321 A | 12/1999 | Abbott |
| 6,009,451 A | 12/1999 | Burns |
| 6,018,755 A | 1/2000 | Gonikberg et al. |
| 6,020,759 A | 2/2000 | Heile |
| 6,021,423 A | 2/2000 | Nag et al. |
| 6,029,187 A | 2/2000 | Verbauwhede |
| 6,031,763 A | 2/2000 | Sansbury |
| 6,041,339 A | 3/2000 | Yu et al. |
| 6,041,340 A | 3/2000 | Mintzer |
| 6,052,327 A | 4/2000 | Reddy et al. |
| 6,052,755 A | 4/2000 | Terrill et al. |
| 6,055,555 A | 4/2000 | Boswell et al. |
| 6,064,614 A | 5/2000 | Khoury |
| 6,065,131 A | 5/2000 | Andrews et al. |
| 6,066,960 A | 5/2000 | Pedersen |
| 6,069,487 A | 5/2000 | Lane et al. |
| 6,072,994 A | 6/2000 | Phillips et al. |
| 6,073,154 A | 6/2000 | Dick |
| 6,075,381 A | 6/2000 | LaBerge |
| 6,084,429 A | 7/2000 | Trimberger |
| 6,085,317 A | 7/2000 | Smith |
| 6,091,261 A | 7/2000 | De Lange |
| 6,091,765 A | 7/2000 | Pietzold, III et al. |
| 6,094,726 A | 7/2000 | Gonion et al. |
| 6,097,988 A | 8/2000 | Tobias |
| 6,098,163 A | 8/2000 | Guttag et al. |
| 6,107,820 A | 8/2000 | Jefferson et al. |
| 6,107,821 A | 8/2000 | Kelem et al. |

| | | | | | | |
|---|---|---|---|---|---|---|
| 6,107,824 | A | 8/2000 | Reddy et al. | 6,963,890 B2 | 11/2005 | Dutta et al. |
| 6,130,554 | A | 10/2000 | Kolze et al. | 6,971,083 B2 | 11/2005 | Farrugia et al. |
| 6,140,839 | A | 10/2000 | Kaviani et al. | 6,978,287 B1 | 12/2005 | Langhammer |
| 6,144,980 | A | 11/2000 | Oberman | 6,983,300 B2 | 1/2006 | Ferroussat |
| 6,154,049 | A | 11/2000 | New | 7,020,673 B2 | 3/2006 | Ozawa |
| 6,157,210 | A | 12/2000 | Zaveri et al. | 7,047,272 B2 | 5/2006 | Giacalone et al. |
| 6,163,788 | A | 12/2000 | Chen et al. | 7,062,526 B1 | 6/2006 | Hoyle |
| 6,167,415 | A | 12/2000 | Fischer et al. | 7,093,204 B2 | 8/2006 | Oktem et al. |
| 6,175,849 | B1 | 1/2001 | Smith | 7,107,305 B2 | 9/2006 | Deng et al. |
| 6,215,326 | B1 | 4/2001 | Jefferson et al. | 7,113,969 B1 | 9/2006 | Green et al. |
| 6,226,735 | B1 | 5/2001 | Mirsky | 7,181,484 B2 | 2/2007 | Stribaek et al. |
| 6,242,947 | B1 | 6/2001 | Trimberger | 7,200,631 B2 * | 4/2007 | Mailaender et al. .......... 708/520 |
| 6,243,729 | B1 | 6/2001 | Staszewski | 7,313,585 B2 | 12/2007 | Winterrowd |
| 6,246,258 | B1 | 6/2001 | Lesea | 7,395,298 B2 | 7/2008 | Debes et al. |
| 6,260,053 | B1 | 7/2001 | Maulik et al. | 7,401,109 B2 | 7/2008 | Koc et al. |
| 6,279,021 | B1 | 8/2001 | Takano et al. | 7,409,417 B2 | 8/2008 | Lou |
| 6,286,024 | B1 | 9/2001 | Yano et al. | 7,415,542 B2 | 8/2008 | Hennedy et al. |
| 6,314,442 | B1 | 11/2001 | Suzuki | 7,421,465 B1 | 9/2008 | Rarick et al. |
| 6,314,551 | B1 | 11/2001 | Borland | 7,428,565 B2 | 9/2008 | Fujimori |
| 6,321,246 | B1 | 11/2001 | Page et al. | 7,428,566 B2 | 9/2008 | Siu et al. |
| 6,323,680 | B1 | 11/2001 | Pedersen et al. | 7,430,578 B2 | 9/2008 | Debes et al. |
| 6,327,605 | B2 | 12/2001 | Arakawa et al. | 7,430,656 B2 | 9/2008 | Sperber et al. |
| 6,351,142 | B1 | 2/2002 | Abbott | 7,447,310 B2 | 11/2008 | Koc et al. |
| 6,353,843 | B1 | 3/2002 | Chehrazi et al. | 7,472,155 B2 | 12/2008 | Simkins et al. |
| 6,359,468 | B1 | 3/2002 | Park et al. | 7,508,936 B2 | 3/2009 | Eberle et al. |
| 6,360,240 | B1 | 3/2002 | Takano et al. | 7,536,430 B2 | 5/2009 | Guevokian et al. |
| 6,362,650 | B1 | 3/2002 | New et al. | 7,567,997 B2 | 7/2009 | Simkins et al. |
| 6,366,944 | B1 | 4/2002 | Hossain et al. | 7,590,676 B1 | 9/2009 | Langhammer |
| 6,367,003 | B1 | 4/2002 | Davis | 7,646,430 B2 | 1/2010 | Brown Elliott et al. |
| 6,369,610 | B1 | 4/2002 | Cheung et al. | 7,668,896 B2 | 2/2010 | Lutz et al. |
| 6,377,970 | B1 | 4/2002 | Abdallah et al. | 7,719,446 B2 | 5/2010 | Rosenthal et al. |
| 6,407,576 | B1 | 6/2002 | Ngai et al. | 7,769,797 B2 | 8/2010 | Cho et al. |
| 6,407,694 | B1 | 6/2002 | Cox et al. | 7,930,335 B2 | 4/2011 | Gura |
| 6,427,157 | B1 | 7/2002 | Webb | 7,930,336 B2 | 4/2011 | Langhammer |
| 6,434,587 | B1 | 8/2002 | Liao et al. | 7,974,997 B2 * | 7/2011 | Arviv et al. .................. 708/520 |
| 6,438,569 | B1 | 8/2002 | Abbott | 2001/0023425 A1 | 9/2001 | Oberman et al. |
| 6,438,570 | B1 | 8/2002 | Miller | 2001/0029515 A1 | 10/2001 | Mirsky |
| 6,446,107 | B1 | 9/2002 | Knowles | 2001/0037352 A1 | 11/2001 | Hong |
| 6,453,382 | B1 | 9/2002 | Heile | 2002/0002573 A1 | 1/2002 | Landers et al. |
| 6,467,017 | B1 | 10/2002 | Ngai et al. | 2002/0038324 A1 | 3/2002 | Page et al. |
| 6,480,980 | B2 | 11/2002 | Koe | 2002/0049798 A1 | 4/2002 | Wang et al. |
| 6,483,343 | B1 | 11/2002 | Faith et al. | 2002/0078114 A1 | 6/2002 | Wang et al. |
| 6,487,575 | B1 | 11/2002 | Oberman | 2002/0089348 A1 | 7/2002 | Langhammer |
| 6,523,055 | B1 | 2/2003 | Yu et al. | 2002/0116434 A1 | 8/2002 | Nancekievill |
| 6,523,057 | B1 | 2/2003 | Savo et al. | 2003/0088757 A1 | 5/2003 | Lindner et al. |
| 6,531,888 | B2 | 3/2003 | Abbott | 2004/0064770 A1 | 4/2004 | Xin |
| 6,538,470 | B1 | 3/2003 | Langhammer et al. | 2004/0083412 A1 | 4/2004 | Corbin et al. |
| 6,542,000 | B1 | 4/2003 | Black et al. | 2004/0103133 A1 | 5/2004 | Gurney |
| 6,556,044 | B2 | 4/2003 | Langhammer et al. | 2004/0122882 A1 | 6/2004 | Zakharov et al. |
| 6,557,092 | B1 | 4/2003 | Callen | 2004/0148321 A1 | 7/2004 | Guevorkian et al. |
| 6,571,268 | B1 | 5/2003 | Giacalone et al. | 2004/0172439 A1 | 9/2004 | Lin |
| 6,573,749 | B2 | 6/2003 | New et al. | 2004/0178818 A1 | 9/2004 | Crotty et al. |
| 6,574,762 | B1 | 6/2003 | Karimi et al. | 2004/0193931 A1 | 9/2004 | Clark et al. |
| 6,591,283 | B1 | 7/2003 | Conway et al. | 2004/0267857 A1 | 12/2004 | Abel et al. |
| 6,591,357 | B2 | 7/2003 | Mirsky | 2004/0267863 A1 | 12/2004 | Bhushan et al. |
| 6,600,495 | B1 | 7/2003 | Boland et al. | 2005/0038842 A1 | 2/2005 | Stoye |
| 6,600,788 | B1 | 7/2003 | Dick et al. | 2005/0144212 A1 | 6/2005 | Simkins et al. |
| 6,628,140 | B2 | 9/2003 | Langhammer et al. | 2005/0144215 A1 | 6/2005 | Simkins et al. |
| 6,687,722 | B1 | 2/2004 | Larsson et al. | 2005/0144216 A1 | 6/2005 | Simkins et al. |
| 6,692,534 | B1 | 2/2004 | Wang et al. | 2005/0166038 A1 | 7/2005 | Wang et al. |
| 6,700,581 | B2 | 3/2004 | Baldwin et al. | 2005/0187997 A1 | 8/2005 | Zheng et al. |
| 6,725,441 | B1 | 4/2004 | Keller et al. | 2005/0187999 A1 | 8/2005 | Zheng et al. |
| 6,728,901 | B1 | 4/2004 | Rajski et al. | 2005/0262175 A1 | 11/2005 | Iino et al. |
| 6,731,133 | B1 | 5/2004 | Feng et al. | 2006/0020655 A1 | 1/2006 | Lin |
| 6,732,134 | B1 | 5/2004 | Rosenberg et al. | 2007/0083585 A1 | 4/2007 | St. Denis et al. |
| 6,744,278 | B1 | 6/2004 | Liu et al. | 2007/0185951 A1 | 8/2007 | Lee et al. |
| 6,745,254 | B2 | 6/2004 | Boggs et al. | 2007/0185952 A1 | 8/2007 | Langhammer et al. |
| 6,763,367 | B2 | 7/2004 | Kwon et al. | 2007/0226287 A1 | 9/2007 | Lin et al. |
| 6,771,094 | B1 | 8/2004 | Langhammer et al. | 2007/0241773 A1 | 10/2007 | Hutchings et al. |
| 6,774,669 | B1 | 8/2004 | Liu et al. | 2008/0133627 A1 | 6/2008 | Langhammer et al. |
| 6,781,408 | B1 | 8/2004 | Langhammer | 2008/0183783 A1 | 7/2008 | Tubbs |
| 6,781,410 | B1 | 8/2004 | Pani et al. | 2009/0028455 A1 | 1/2009 | Nakamura et al. |
| 6,788,104 | B2 | 9/2004 | Singh et al. | 2009/0172052 A1 | 7/2009 | DeLaquil et al. |
| 6,801,924 | B1 | 10/2004 | Green et al. | 2009/0187615 A1 | 7/2009 | Abe et al. |
| 6,836,839 | B2 | 12/2004 | Master et al. | 2009/0300088 A1 | 12/2009 | Michaels et al. |
| 6,874,079 | B2 | 3/2005 | Hogenauer | 2010/0098189 A1 | 4/2010 | Oketani |
| 6,889,238 | B2 | 5/2005 | Johnson | 2012/0113133 A1 | 5/2012 | Shpigelblat |
| 6,904,471 | B2 | 6/2005 | Boggs et al. | 2012/0191967 A1 | 7/2012 | Lin et al. |
| 6,924,663 | B2 | 8/2005 | Masui et al. | | | |

FOREIGN PATENT DOCUMENTS

| | | |
|---|---|---|
| EP | 0 411 491 | 2/1991 |
| EP | 0 461 798 | 12/1991 |
| EP | 0 498 066 | 8/1992 |
| EP | 0 555 092 | 8/1993 |
| EP | 0 606 653 | 7/1994 |
| EP | 0 657 803 | 6/1995 |
| EP | 0 660 227 | 6/1995 |
| EP | 0 668 659 | 8/1995 |
| EP | 0 721 159 | 7/1996 |
| EP | 0 905 906 | 3/1999 |
| EP | 0 909 028 | 4/1999 |
| EP | 0 927 393 | 7/1999 |
| EP | 0 992 885 | 4/2000 |
| EP | 1 031 934 | 8/2000 |
| EP | 1 058 185 | 12/2000 |
| EP | 1 220 108 | 7/2002 |
| GB | 2 283 602 | 5/1995 |
| GB | 2 286 737 | 8/1995 |
| GB | 2 318 198 | 4/1998 |
| JP | 61-237133 | 10/1986 |
| JP | 63-216131 | 8/1988 |
| JP | 4-332036 | 11/1992 |
| JP | 5-134851 | 6/1993 |
| JP | 06-187129 | 7/1994 |
| JP | 7-135447 | 5/1995 |
| JP | 11-296345 | 10/1999 |
| JP | 2000-259394 | 9/2000 |
| JP | 2002-108606 | 4/2002 |
| JP | 2002-251281 | 9/2002 |
| WO | WO95-27243 | 10/1995 |
| WO | WO96-28774 | 9/1996 |
| WO | WO97-08606 | 3/1997 |
| WO | WO98-12629 | 3/1998 |
| WO | WO98-32071 | 7/1998 |
| WO | WO98-38741 | 9/1998 |
| WO | WO99-22292 | 5/1999 |
| WO | WO99-31574 | 6/1999 |
| WO | WO99-56394 | 11/1999 |
| WO | WO00-51239 | 8/2000 |
| WO | WO00-52824 | 9/2000 |
| WO | WO01-13562 | 2/2001 |
| WO | WO 2005/066832 | 7/2005 |
| WO | WO2005-101190 | 10/2005 |

OTHER PUBLICATIONS

Govindu, G. et al., "A Library of Parameterizable Floating-Point Cores for FPGAs and Their Application to Scientific Computing," *Proc Int'l Conf. Eng. Reconfigurable Systems and Algorithms (ERSA'05)* Jun. 2005.

Govindu, G. et al., "Analysis of High-performance Floating-point Arithmetic on FPGAs," *Proceedings of the 18th International Parallel and Distributed Processing Symposium (PDPS'04)*, pp. 149-156, Apr. 2004.

Nakasato, N., et al., "Acceleration of Hydrosynamical Simulations using a FPGA board" *The Institute of Electronics Information and Communication Technical Report CPSY2005-47*, vol. 105, No. 515, Jan. 17, 2006.

Osana, Y., et al., "Hardware-resource Utilization Analysis on an FPGA-Based Biochemical Simulator ReCSiP", *The Institute of Electronics Information and Communication Technical Report CPSY2005-63*, vol. 105, No. 516, Jan. 18, 2006.

Vladimirova, T. et al., "Floating-Point Mathematical Co-Processor for a Single-Chip On-Board Computer," *MAPLD'03 Conference, D5*, Sep. 2003.

Altera Corporation, "DSP Blocks in Stratix II and Stratix II GX Devices," *Stratix II Device Handbook*, vol. 2, Chapter 6, v4.0 (Oct. 2005).

Amos, D., "PLD architectures match DSP algorithms" *Electronic Product Design*, vol. 17, No. 7, Jul. 1996, pp. 30, 32.

Analog Devices, Inc., The Applications Engineering Staff of Analog Devices, DSP Division, *Digital Signal Processing Applications Using the ADSP-2100 Family* (edited by Amy Mar), 1990, pp. 141-192).

Andrejas, J., et al., "Reusable DSP functions in FPGAs," *Field-Programmable Logic and Applications. Roadmap to Reconfigurable Computing. 10th International Conference, FPL 2000. Proceedings (Lecture Notes in Computer Science* vol. 1896), Aug. 27-30, 2000, pp. 456-461.

Aoki, T., "Signed-weight arithmetic and its application to a field-programmable digital filter architecture," *IEICE Transactions on Electronics*, 1999, vol. E82C, No. 9, Sep. 1999, pp. 1687-1698.

Ashour, M.A., et al., "An FPGA implementation guide for some different types of serial-parallel multiplier-structures," *Microelectronics Journal*, vol. 31, No. 3, 2000, pp. 161-168.

Berg. B.L., et al. "Designing Power and Area Efficient Multistage FIR Decimators with Economical Low Order Filters," *ChipCenter Technical Note*, Dec. 2001.

Bursky, D., "Programmable Logic Challenges Traditional ASIC SoC Designs", *Electronic Design*, Apr. 15, 2002.

Chhabra, A. et al., Texas Instruments Inc., "A Block Floating Point Implementation on the TMS320C54x DSP", Application Report SPRA610, Dec. 1999, pp. 1-10.

Colet, p., "When DSPs and FPGAs meet: Optimizing image processing architectures," *Advanced Imaging*, vol. 12, No. 9, Sep. 1997, pp. 14, 16, 18.

Crookes, D., et al., "Design and implementation of a high level programming environment for FPGA-based image processing," *IEE Proceedings-Vision, Image and Signal Processing*, vol. 147, No. 4, Aug. 2000, pp. 377-384.

Debowski, L., et al., "A new flexible architecture of digital control systems based on DSP and complex CPLD technology for power conversion applications," *PCIM 2000: Europe Official Proceedings of the Thirty-Seventh International Intelligent Motion Conference*, Jun. 6-8, 2000, pp. 281-286.

Dick, C., et al., "Configurable logic for digital communications: some signal processing perspectives," *IEEE Communications Magazine*, vol. 37, No. 8, Aug. 1999, pp. 107-111.

Do, T.-T., et al., "A flexible implementation of high-performance FIR filters on Xilinx FPGAs," *Field-Programmable Logic and Applications: From FPGAs to Computing Paradigm. 8th International Workshop, FPL'98. Proceedings*, Hartenstein, R.W., et al., eds., Aug. 31-Sep. 3, 1998, pp. 441-445.

Gaffer, A.A., et al., "Floating-Point Bitwidth Analysis via Automatic Differentiation," *IEEE Conference on Field Programmable Technology*, Hong Kong, Dec. 2002.

Guccione, S.A., "Run-time Reconfiguration at Xilinx" *Parallel and distributed processing: 15 IPDPS 2000 workshops*, Rolim, J., ed., May 1-5, 2000, p. 873.

Hauck, S., "The Future of Reconfigurable Systems," *Keynote Address, 5th Canadian Conference on Field Programmable Devices*, Jun. 1998, http:--www.ee.washington.edu-people-faculty-hauck-publications-ReconfigFuture.PDF.

Heysters, P.M., et al., "Mapping of DSP algorithms on field programmable function arrays," *Field-Programmable Logic and Applications. Roadmap to Reconfigurable Computing. 10th International Conference, FPL 2000. Proceedings (Lecture Notes in Computer Science* vol. 1896) Aug. 27-30, 2000, pp. 400-411.

Huang, J., et al., "Simulated Performance of 1000BASE-T Receiver with Different Analog Front End Designs," *Proceedings of the 35th Asilomar Conference on Signals, Systems, and Computers*, Nov. 4-7, 2001.

Lattice Semiconductor Corp, *ORCA® FPGA Express™ Interface Manual: ispLEVER® Version 3.0*, 2002.

Lucent Technologies, Microelectronics Group, "Implementing and Optimizing Multipliers in ORCA™ FPGAs,", Application Note. AP97-008FGPA, Feb. 1997.

"Implementing Multipliers in FLEX 10K EABs", *Altera*, Mar. 1996.

"Implementing Logic with the Embedded Array in FLEX 10K Devices", *Altera*, May 2001, ver. 2.1.

Jinghua Li, "Design a pocket multi-bit multiplier in FPGA" *1996 2nd International Conference on ASIC Proceedings (IEEE Cat. No. 96TH8140)* Oct. 21-24, 1996, pp. 275-279.

Jones, G., "Field-programmable digital signal conditioning," *Electronic Product Design*, vol. 21, No. 6, Jun. 2000, pp. C36-C38.

Kiefer, R., et al., "Performance comparison of software-FPGA hardware partitions for a DSP application" *14th Australian Microelec-* tronics Conference.Microelectronics: Technology Today for the Future. MICRO '97 Proceedings, Sep. 28-Oct. 1, 1997, pp. 88-93.

Kramberger, I., "DSP acceleration using a reconfigurable FPGA," ISIE '99. Proceedings of the IEEE International Symposium on Industrial Electronics (Cat. No. 99TH8465) vol. 3, Jul. 12-16, 1999, pp. 1522-1525.

Langhammer, M., "How to implement DSP in programmable logic" Elettronica Oggi, No. 266, Dec. 1998, pp. 113-115.

Langhammer, M., "Implementing a DSP in Programmable Logic," Online EE Times, May 1998, http:--www.eetimes.com-editorial-1998-coverstory9805.html.

Lazaravich, B.V., "Function block oriented field programmable logic arrays," Motorola, Inc. Technical Developments, vol. 18, Mar. 1993, pp. 10-11.

Lund, D., et al., "A new development system for reconfigurable digital signal processing," First International Conference on 3G Mobile Communication Technologies (Conf. Publ. No. 471), Mar. 27-29, 2000, pp. 306-310.

Miller, N.L., et al., "Reconfigurable integrated circuit for high performance computer arithmetic," Proceedings of the 1998 IEE Colloquium on Evolvable Hardware Systems (Digest), No. 233, 1998, pp. 2-1-2-4.

Mintzer, L., "Xilinx FPGA as an FFT processor," Electronic Engineering, vol. 69, No. 845, May 1997, pp. 81, 82, 84.

Faura et al., "A Novel Mixed Signal Programmable Device With On-Chip Microprocessor," Custom Integrated Circuits Conference, 1997. Proceedings of the IEEE 1997 Santa Clara, CA, USA, May 5, 1997, pp. 103-106.

Nozal, L., et al., "A new vision system: programmable logic devices and digital signal processor architecture (PLD+DSP)," Proceedings IECON '91. 1991 International Conference on Industrial Electronics, Control and Instrumentation (Cat. No. 91CH2976-9), vol. 3, Oct. 28-Nov. 1, 1991, pp. 2014-2018.

Papenfuss, J.R, et al., "Implementation of a real-time, frequency selective, RF channel simulator using a hybrid DSP-FPGA architecture," RAWCON 2000: 2000 IEEE Radio and Wireless Conference (Cat. No. 00EX404), Sep. 10-13, 2000, pp. 135-138.

Parhami, B., "Configurable arithmetic arrays with data-driven control" 34th Asilomar Conference on Signals, Systems and Computers, vol. 1, 2000, pp. 89-93.

"The QuickDSP Design Guide", Quicklogic, Aug. 2001, revision B.

"QuickDSP™ Family Data Sheet", Quicklogic, Aug. 7, 2001, revision B.

Rangasayee, K., "Complex PLDs let you produce efficient arithmetic designs," EDN (European Edition), vol. 41, No. 13, Jun. 20, 1996, pp. 109, 110, 112, 114, 116.

Rosado, A., et al., "A high-speed multiplier coprocessor unit based on FPGA," Journal of Electrical Engineering, vol. 48, No. 11-12, 1997, pp. 298-302.

Santillan-Q., G.F., et al., "Real-time integer convolution implemented using systolic arrays and a digit-serial architecture in complex programmable logic devices," Proceedings of the Third International Workshop on Design of Mixed-Mode Integrated Circuits and Applications (Cat. No. 99EX303), Jul. 26-28, 1999, pp. 147-150.

Texas Instruments Inc., "TMS320C54x DSP Reference Set, vol. 1: CPU and Peripherals", Literature No. SPRU131F, Apr. 1999, pp. 2-1 through 2-16 and 4-1 through 4-29.

Tisserand, A., et al., "An on-line arithmetic based FPGA for low power custom computing," Field Programmable Logic and Applications, 9th International Workshop, FPL '99, Proceedings (Lecture Notes in Computer Science vol. 1673), Lysaght, P., et al., eds., Aug. 30-Sep. 1, 1999, pp. 264-273.

Tralka, C., "Symbiosis of DSP and PLD," Elektronik, vol. 49, No. 14, Jul. 11, 2000, pp. 84-96.

Underwood, K. "FPGAs vs. CPUs: Trends in Peak Floating-Point Performance," Proceedings of the 2004 ACM-SIGDA 12th International Symposium on Field Programmable Gate Arrays, pp. 171-180, Feb. 22-24, 2004.

Valls, J., et al., "A Study About FPGA-Based Digital Filters," Signal Processing Systems, 1998, SIPS 98, 1998 IEEE Workshop, Oct. 10, 1998, pp. 192-201.

"Virtex-II 1.5V Field-Programmable Gate Arrays", Xilinx, Jan. 25, 2001, module 2 of 4.

"Virtex-II 1.5V Field-Programmable Gate Arrays", Xilinx, Apr. 2, 2001, module 1 of 4.

"Virtex-II 1.5V Field-Programmable Gate Arrays", Xilinx, Apr. 2, 2001, module 2 of 4.

Walters, A.L., "A Scaleable FIR Filter Implementation Using 32-bit Floating-Point Complex Arithmetic on ,a FPGA Based Custom Computing Platform," Allison L. Walters, Thesis Submitted to the Faculty of Virginia Polytechnic Institute and State University, Jan. 30, 1998.

Weisstein, E.W., "Karatsuba Multiplication" MathWorld—A Wolfram Web Resource (Dec. 9, 2007), accessed Dec. 11, 2007 at http:--mathworld.wolfram.com-KaratsubaMultiplication.html.

Wenzel, L., "Field programmable gate arrays (FPGAs) to replace digital signal processor integrated circuits," Elektronik, vol. 49, No. 5, Mar. 7, 2000, pp. 78-86.

"Xilinx Unveils New FPGA Architecture to Enable High-Performance, 10 Million System Gate Designs", Xilinx, Jun. 22, 2000.

"Xilinx Announces DSP Algorithms, Tools and Features for Virtex-II Architecture", Xilinx, Nov. 21, 2000.

Xilinx Inc., "Virtex-II 1.5V Field-Programmable Gate Arrays", Advance Product Specification, DS031-2 (v1.9), Nov. 29, 2001, Module 2 of 4, pp. 1-39.

Xilinx Inc., "Using Embedded Multipliers", Virtex-II Platform FPGA Handbook, UG002 (v1.3), Dec. 3, 2001, pp. 251-257.

Xilinx, Inc., "A 1D Systolic FIR," copyright 1994-2002, downloaded from http:--www.iro.umontreal.ca-~aboulham-F6221-Xilinx%20A%201D%20systolic%20FIR.htm.

Xilinx, Inc., "The Future of FPGA's," White Paper, available Nov. 14, 2005 for download from http:--www.xilinx.com-prs_rls,5yrwhite.htm.

Xilinx Inc., "XtremeDSP Design Considerations User Guide," v 1.2, Feb. 4, 2005.

Altera Corporation, "Digital Signal Processing (DSP)," Stratix Device Handbook, vol. 2, Chapter 6 and Chapter 7, v1.1 (Sep. 2004).

Altera Corporation, "Advanced Synthesis Cookbook: A Design Guide for Stratix II, Stratix III and Stratix IV Devices," Document Version 3.0, 112 pgs., May 2008.

deDinechin, F. et al., "Large multipliers with less DSP blocks," retrieved from http://hal-ens-lyon.archives-ouvertes.fr/ensl-00356421/en/, 9 pgs., available online Jan. 2009.

Wajih, E.-H.Y. et al., "Efficient Hardware Architecture of Recursive Karatsuba-Ofman Multiplier," 3rd International Conference on Design and Technology of Integrated Systems in Nanoscale Era, 6 pgs, Mar. 2008.

Zhou, G. et al., "Efficient and High-Throughput Implementations of AES-GCM on FPGAs," International Conference on Field-Programmable Technology, 8 pgs., Dec. 2007.

Altera Corporation, "Stratix II Device Handbook, Chapter 6—DSP Blocks in Stratix II Devices," v1.1, Jul. 2004.

Xilinx Inc., "Complex Multiplier v2.0", DS291 Product Specification/Datasheet, Nov. 2004.

Haynes, S.D., et al., "Configurable multiplier blocks for embedding in FPGAs," Electronics Letters, vol. 34, No. 7, pp. 638-639 (Apr. 2, 1998).

Kim, Y., et al., "Fast GPU Implementation for the Solution of Tridiagonal Matrix Systems," Journal of Korean Institute of Information Scientists and Engineers, vol. 32, No. 12, pp. 692-704, Dec. 2005.

* cited by examiner

QR DECOMPOSITION IN AN INTEGRATED CIRCUIT DEVICE

BACKGROUND OF THE INVENTION

This invention relates to performing QR decomposition operations in integrated circuit devices, and particularly in programmable integrated circuit devices such as programmable logic devices (PLDs).

QR decomposition (also called a QR factorization) of a matrix is a decomposition of the matrix into an orthogonal matrix Q and a right triangular matrix R. QR decomposition may be used, for example, to solve the linear least squares problem. QR decomposition also is the basis for a particular eigenvalue algorithm called the QR algorithm One known technique for performing QR decomposition is the Gram-Schmidt technique, which calculates the Q matrix as follows (where A is the input matrix, having columns $a_i$ and elements $a_{ij}$):

for i=1 to n do
 $v_i = a_i$
end for
for i=1 to n do
 $r_{ii} = \|v_i\|$
 $q_i = v_i/r_{ii}$
 for j=i+1 to n do
  $r_{ij} = q_i^T v_j$
  $v_j = v_j - r_{ij} q_i$
 end for
end for As can be seen, there are two data dependencies, one in the outer loop, where $q_i$ cannot be computed until $r_{ii}$ has been computed, and one in the inner loop, where $r_{ij}$ cannot be computed until $q_i^T$ has been computed. Such data dependencies can cause delays when the computation is performed in hardware, and also may be of concern in a software implementation in a multicore processor environment, or even in a single core processor environment if the processor is deeply pipelined and the pipeline is optimized for more functions more common than division.

SUMMARY OF THE INVENTION

The present invention relates to circuitry for speeding up the QR decomposition of a matrix. The circuitry can be provided in a fixed logic device, or can be configured into a programmable integrated circuit device such as a programmable logic device (PLD). This implementation performs Gram-Schmidt orthogonalization with no dependencies between iterations.

In accordance with embodiments of the invention, QR decomposition of a matrix can be performed by processing entire columns at once as a vector operation. Data dependencies between matrix columns are removed, as later functions dependent on an earlier result may be generated from partial results somewhere in the datapath, rather than from an earlier completed result. There is no added hardware cost, as long as the different passes through the matrix are timed so that different computations requiring the same functional units arrive at different time slots.

By structuring the Gram-Schmidt algorithm differently, the result is that there are no immediate data dependencies between columns of the processed matrix. Any data dependencies that exist are separated by many clocks, allowing all calculations time to flow through a pipelined datapath with a very long latency, so that no wait states are introduced in the calculation of the Q matrix. In addition, the R matrix can be directly computed from the Q matrix. In an embodiment according to the present invention, direct access to the required Q elements allows re-use of one of the Q calculation datapaths to immediately generate an R matrix output element on each clock cycle once calculation of the R matrix begins.

Circuitry according to the invention implements the following modified Gram-Schmidt algorithm:

for i=1 to n do
 $v_i = a_i$
end for
for i=1 to n do
 $r_{ii} = \|v_i\|$
 for j=i+1 to n do
  $r_{ij} = v_j v_i / \|v_i\|$
 end for
 $q_i = v_i / r_{ii}$
 for j=i+1 to n do
  $v_j = v_j - r_{ijq} q_i$
 end for
end for As described later, the $r_{ij} q_i$ term will be replaced by a set of values that already exist at some point in the datapath, completely removing $q_i$ as a data dependency.

As can be seen, data dependencies have been removed in this implementation. All of the $r_{ij}$ terms are computed first. There is no data dependency on $\|v_i\|$ (i.e., the norm of the $v_i$ vector, which is the square root of the sum of the squares of the elements of the vector) because the $v_j v_i$ terms are computed immediately following the $v_i v_i$ term used for the norm. The second datapath then streams all of these functions in, selectively computing either the $\|v_i\|$ norm or the following $r_{ij}$ terms (once viva has been computed—e.g., during computation of the norm—it preferably is latched for use in the $r_{ij}$ calculations).

Both the input matrix A and the processing matrix Q preferably are stored in a plurality of row memories. This allows an entire column to be accessed in a single cycle by reading the corresponding elements across the row memories.

At the start of each iteration, an entire starting column $a_i$ is read, and the norm of that column in calculated in two steps. The first column is latched into one of the inputs to a first datapath during the calculation of a first pass. The second input to the first datapath is the current column from the memory. First, when the current column is the first column, the inner product of the column with itself is calculated through the first datapath, and latched to the input of a second datapath. The second datapath generates the inverse norm of the first inner product, and then uses the latched first inner product to generate the subsequent values, which are the inner product of the current column with the first column, divided by the inner product of the first column with itself. The columns may be read, one per clock, to create a stream of continuous norm combinations. This sequence of operations generates the results of the first inner loop shown above:

$r_{ii} = \|v_i\|$
 for j=i+1 to n do
  $r_{ij} = v_j v_i / \|v_i\|$
 end for

The same sequence of columns is read a second time, timed so that the columns arrive at the first datapath at the same time as the norm combinations for that column. The first column (in this case $v_i$) is latched on the input of the first datapath, which then calculates the new column iterations. Specifically, the iteration for each column is the difference between that column and the product of that column's norm combination ($r_{ij}$) multiplied by the latched first column. This sequence of operations generates the results of the second inner loop:

$q_i = v_i / r_{ii}$
for j=i+1 to n do
   $v_j = v_j - r_{ij} q_i$
end for

Taken as a whole, the computation may be written as follows:

for i=1 to n do
   $v_i = a_i$
end for
for i=1 to n do
   $r_{ii} = \|v_i\|$
   for j=i+1 to n do
      $r_{ij} = v_j v_i / \|v_i\|$
   end for
   $q_i = v_i / r_{ii}$
   for j=i+1 to n do
      $v_j = v_j - r_{ij} q_i$
   end for
end for Remembering that $r_{ii} = \|v_i\|$, $r_{ij} = v_j v_i / \|v_i\|$, and $q_i = v_i / r_{ii}$, then $r_{ij} q_i = (v_j v_i / \|v_i\|) \times v_i / r_{ii} = (v_j v_i / \|v_i\|) \times v_i / \|v_i\| = (<v_j, v_i> / \|v_i\|^2) * \times v_i$. This means that the computation can be written as:

for i=1 to n do
   $v_i = a_i$
end for
for i=1 to n do
   $r_{ii} = \|v_i\|$
   for j=i+1 to n do
      $r_{ii} = v_j v_i / \|v_i\|$
   end for
   $q_i = v_i / r_{ii}$
   for j=i+1 to n do
      $v_j = v_j - (<v_j, v_i> / \|v_i\|^2) \times v_i$
   end for
end for The $v_j$ vectors are read in one per clock. The ($<v_j, v_i> / <v_i, v_i>$) norm combinations are streamed in from the second datapath, calculated in the first pass. The $v_i$ term is latched into the first datapath for the entire second pass. In other words the $r_{ij}$ values do not have to be explicitly calculated and stored, as their contribution to the second pass is incorporated into the ($<v_j, v_i> / <v_i, v_i>$) norm combination.

As discussed in more detail below, after the Q matrix has been calculated, the R matrix may be calculated from the Q matrix by taking its transpose and multiplying the transpose by the original input A matrix, as follows:

$$R = Q^T A$$

Therefore, in accordance with the present invention, there is provided circuitry for performing QR decomposition of an input matrix. The circuitry includes a first datapath for performing multiplication and addition operations on columns of the input matrix, where the first datapath includes a plurality of multipliers, a corresponding plurality of adders each having an input connected to an output of one of the multipliers, and a summer having inputs connected to the outputs of the multipliers, and a second datapath for performing an inverse square root operation and a multiplication operation on an output of the summer of the first datapath. On a first pass, the first datapath computes respective inner products of the first indexed column of the input matrix for that iteration with each column of the input matrix, and the second datapath computes an inverse norm of the first column and multiplies that inverse norm of the first column by respective inner products of the first column with each other column of the input matrix to form respective norm combinations. On a second pass, the adders of the first datapath compute a respective difference between each other column and a product of the first column and a respective one of the norm combinations.

A method of configuring such circuitry on a programmable device, a programmable device so configurable, and a machine-readable data storage medium encoded with software for performing the method, are also provided.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which.

DETAILED DESCRIPTION OF THE INVENTION

Figure 1:
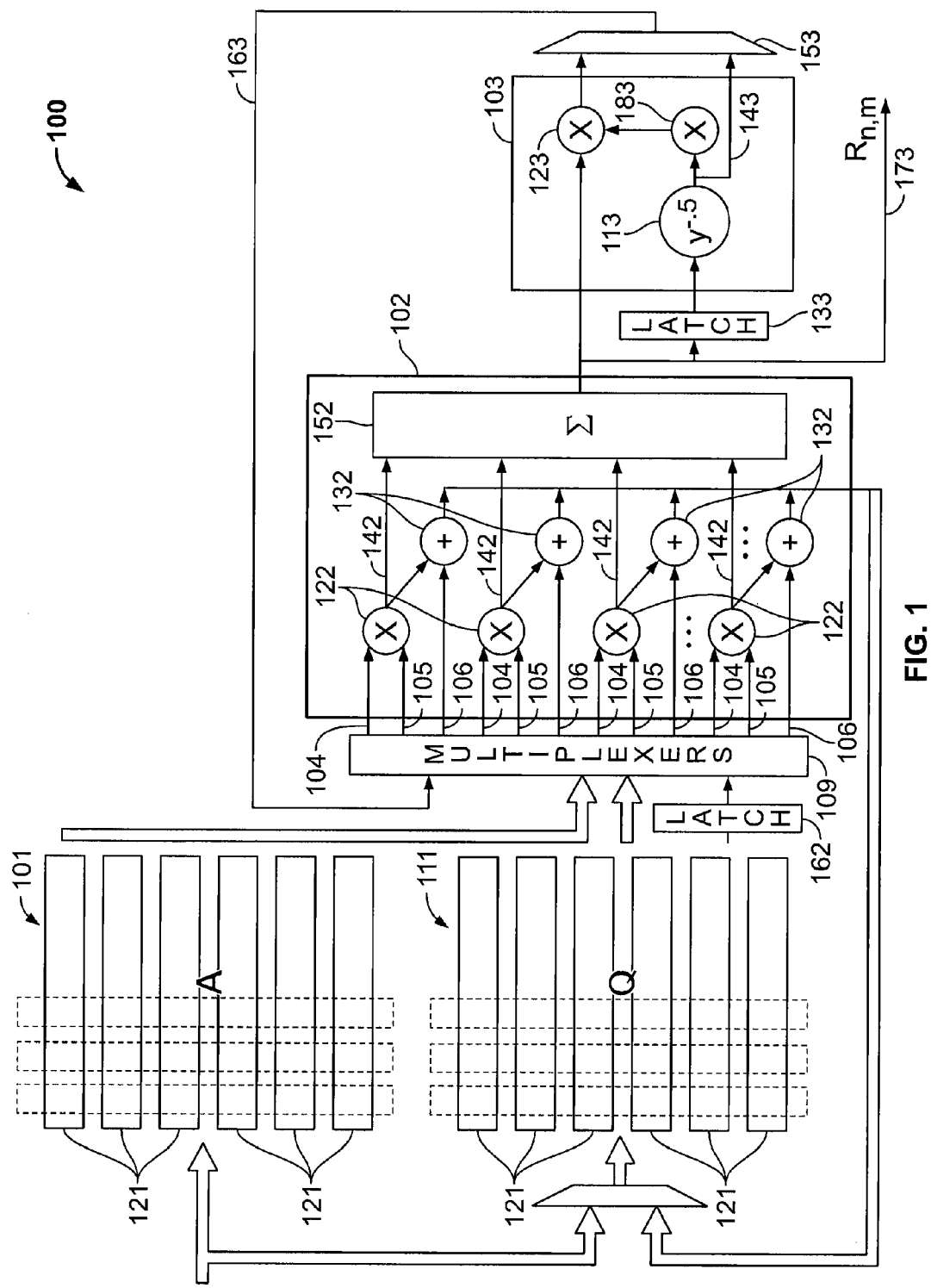
FIG. 1 shows one embodiment, according to the invention, of a datapath arrangement for QR decomposition.

A circuit implementation 100 for QR decomposition according to an embodiment of the present invention is shown in FIG. 1.

Circuit 100 includes two input matrix stores 101, 111, a first datapath 102, and a second datapath 103. An input matrix A is input to both matrix store 101 and matrix store 111. The calculations of orthogonal matrix Q are made on the copy in matrix store 111. The copy in matrix store 101 is kept for the computation of right triangular matrix R after matrix Q has been computed. Each of matrix stores 101, 111 may include a plurality of row memories 121. This enables entire columns to be read out in a single clock cycle by reading across the row memories—i.e., by reading corresponding elements from each row memory in the same clock cycle—which facilitates the row-based operations described above. For example, if an embodiment of the invention is implemented in programmable logic devices from Altera Corporation, of San Jose, Calif., many models of those devices provide a plurality of 9 kb user memories which may be employed for this purpose. Other memory structures also may be used.

Computation of matrix Q is performed in two passes. The first pass, which computes the $r_{ij}$ terms, uses both datapaths 102 and 103, while the second pass, which computes the $q_i$ columns, uses only datapath 102.

In the first pass, the inverse norm of the first column is calculated, followed by the inner product of the first and current columns divided by the inner product of the first column by itself. The norm of the first column is the square root of the inner product of the first column with itself. These operations therefore amount to taking the respective inner products of the first column with itself and each other column. The inner product of the first column with itself is used to provide the norm of the first column by taking the inverse square root of that inner product. That inner product of the first column with itself is then latched or stored at the entry to datapath 103 and used with each subsequent inner product to obtain the quotient of the inner product of each column and the norm of the first column, as described below.

The inner products are calculated in first datapath 102 containing multipliers 122 and adders 132. The inverse square root is calculated at 113 in second datapath 103. Multiplier 183 has as one input inverse square root 113, and as its other input may have either "1" or the inverse square root 113, so that, depending on what is required, it outputs either inverse square root 113 or it square (i.e., the inverse of the input to inverse square root 113). Multiplier 123 thus multiplies the input to datapath 103 either by inverse square root 113 or by the square of inverse square root 113 (i.e., divides the input by the square root or by the square of the square root).

The inputs to first datapath 102 during the first pass, as controlled by a bank of multiplexers 109, are only inputs 104, 105 to multipliers 122, with one of the inputs 104 always being the first column $v_i$, while the inputs 106 to the individual adders 132 are zeroed.

In the first pass, multipliers 122 thus calculate the products of the elements of the first column $v_i$ with its own elements or the elements of the current column $v_j$. Those products 142 are then summed by summer 152 to yield the inner products $v_i v_i$ or $v_i v_j$. $v_i v_i$ is latched at 133 at the input to inverse square root 113, which therefore always outputs $1/\|v_i\|$. On the first cycle of the second pass, that output 143 is selected by output multiplexer 153 and input to first datapath 102 to calculate $q_i$. Otherwise, output multiplexer 153 outputs a stream of norm combinations 163 ($v_i v_j/\|v_i\|^2$) which are fed back to the input of first datapath 102 for use during the second pass as described below.

During the second pass, inputs 106 to the individual adders 132, again selected by multiplexers 109, are the elements of the current column $v_j$. The other inputs 116 to adders 132 are negated (not shown) so that adders 132 subtract the outputs of multipliers 122 from the current column $v_j$. One of the inputs to multipliers 122 is the stream of norm combinations 163, and the other is the elements of the first column $v_i$, latched at 162. First, $q_i$ is calculated by dividing each element of column $v_i$ by the value 143 of $1/\|v_i\|$. The remainder of the second pass is timed so that each column arrives at the first datapath at the same time as the norm combinations 163 for that column. The outputs of the individual adders 132 are written back to the Q memory 101. After all j iterations have been completed, the Q matrix processing for the ith column is complete. This is repeated for all i columns.

The R matrix can then be calculated using $R=Q^T A$ as set forth above. In this calculation, dot products are formed from a respective row of the $Q^T$ matrix and corresponding column of the A matrix. Because the rows of the Q matrix are stored in individual memories as described above, allowing columns to easily be read by reading across all rows at once, and because the rows of the $Q^T$ matrix are the columns of the Q matrix, the desired dot products are those of corresponding columns of the Q and A matrices. Multiplexers 109 into the first datapath are changed again, to provide one multiplier input 104 from the A memory 101, and the other multiplier input 105 from the Q memory 111. Inputs 106 to the individual adders are zeroed. Each dot product will produce an element of the R matrix, which will be burst out at 173, row by row.

Thus it is seen that circuitry and methods for performing QR decomposition with reduced data dependencies has been provided. This invention may have use in hard-wired implementations of QR decompositions, as well as in software implementations in multi-core processors where data dependencies across processor cores may be a factor.

Another potential use for the present invention may be in programmable integrated circuit devices such as programmable logic devices, where programming software can be provided to allow users to configure a programmable device to perform matrix operations. The result would be that fewer logic resources of the programmable device would be consumed. And where the programmable device is provided with a certain number of dedicated blocks for arithmetic functions (to spare the user from having to configure arithmetic functions from general-purpose logic), the number of dedicated blocks needed to be provided (which may be provided at the expense of additional general-purpose logic) can be reduced (or sufficient dedicated blocks for more operations, without further reducing the amount of general-purpose logic, can be provided).

The calculations described above may be done as fixed-point calculations or floating-point calculations. If floating point calculations are used, the various operators used for the calculations described above can be configured in a programmable device using, e.g., the techniques described in copending, commonly-assigned U.S. patent application Ser. No. 11/625,655, filed Jan. 22, 2007, which is hereby incorporated by reference herein in its entirety, which conserves resources by limiting the normalization of intermediate results, as described therein.

Instructions for carrying out a method according to this invention for programming a programmable device to perform matrix decomposition may be encoded on a machine-readable medium, to be executed by a suitable computer or similar device to implement the method of the invention for programming or configuring PLDs or other programmable devices to perform addition and subtraction operations as described above. For example, a personal computer may be equipped with an interface to which a PLD can be connected, and the personal computer can be used by a user to program the PLD using a suitable software tool, such as the QUARTUS® II software available from Altera Corporation, of San Jose, Calif.

Figure 2:
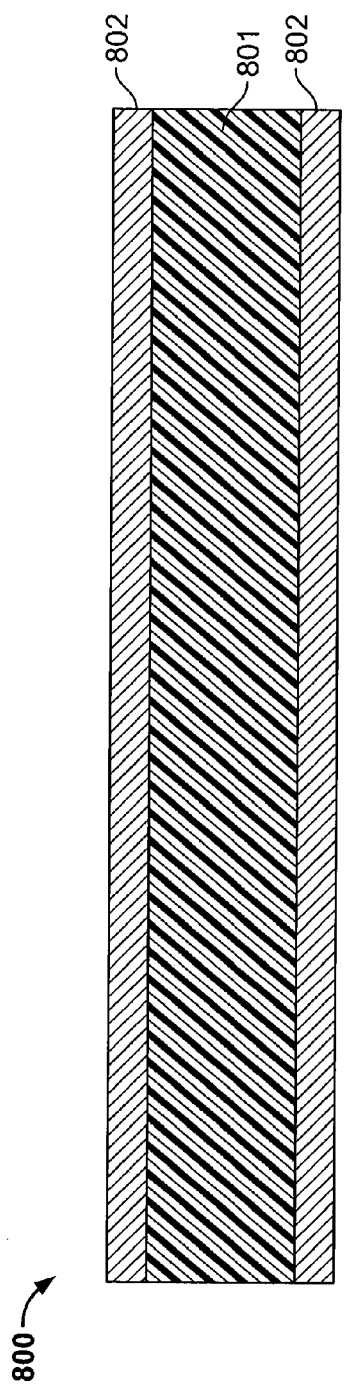
FIG. 2 is a cross-sectional view of a magnetic data storage medium encoded with a set of machine-executable instructions for performing the method according to the present invention.

FIG. 2 presents a cross section of a magnetic data storage medium 800 which can be encoded with a machine executable program that can be carried out by systems such as the aforementioned personal computer, or other computer or similar device. Medium 800 can be a floppy diskette or hard disk, or magnetic tape, having a suitable substrate 801, which may be conventional, and a suitable coating 802, which may be conventional, on one or both sides, containing magnetic domains (not visible) whose polarity or orientation can be altered magnetically. Except in the case where it is magnetic tape, medium 800 may also have an opening (not shown) for receiving the spindle of a disk drive or other data storage device.

The magnetic domains of coating 802 of medium 800 are polarized or oriented so as to encode, in manner which may be conventional, a machine-executable program, for execution by a programming system such as a personal computer or other computer or similar system, having a socket or peripheral attachment into which the PLD to be programmed may be inserted, to configure appropriate portions of the PLD, including its specialized processing blocks, if any, in accordance with the invention.

Figure 3:
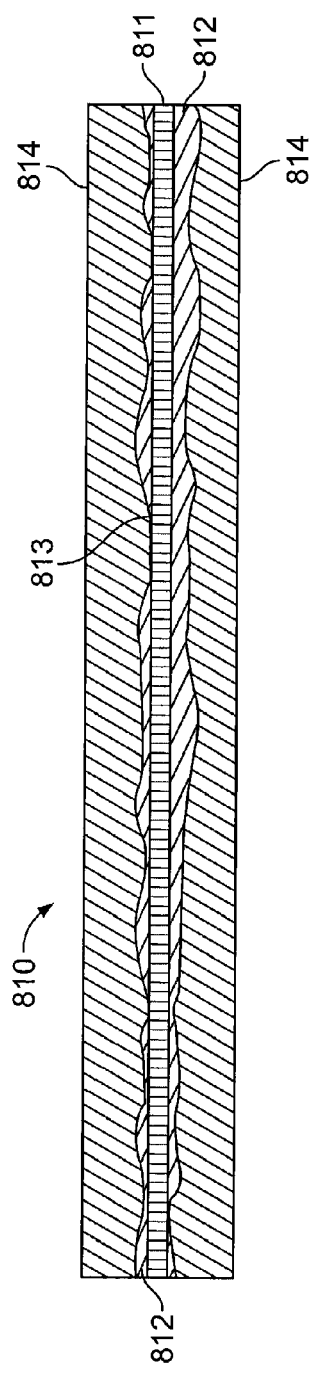
FIG. 3 is a cross-sectional view of an optically readable data storage medium encoded with a set of machine executable instructions for performing the method according to the present invention.

FIG. 3 shows a cross section of an optically-readable data storage medium 810 which also can be encoded with such a machine-executable program, which can be carried out by systems such as the aforementioned personal computer, or other computer or similar device. Medium 810 can be a conventional compact disk read-only memory (CD-ROM) or digital video disk read-only memory (DVD-ROM) or a rewriteable medium such as a CD-R, CD-RW, DVD-R, DVD-RW, DVD+R, DVD+RW, or DVD-RAM or a magneto-optical disk which is optically readable and magneto-optically rewriteable. Medium 810 preferably has a suitable substrate 811, which may be conventional, and a suitable coating 812, which may be conventional, usually on one or both sides of substrate 811.

In the case of a CD-based or DVD-based medium, as is well known, coating 812 is reflective and is impressed with a plurality of pits 813, arranged on one or more layers, to encode the machine-executable program. The arrangement of pits is read by reflecting laser light off the surface of coating 812. A protective coating 814, which preferably is substantially transparent, is provided on top of coating 812.

In the case of magneto-optical disk, as is well known, coating 812 has no pits 813, but has a plurality of magnetic domains whose polarity or orientation can be changed magnetically when heated above a certain temperature, as by a laser (not shown). The orientation of the domains can be read by measuring the polarization of laser light reflected from coating 812. The arrangement of the domains encodes the program as described above.

Figure 4:
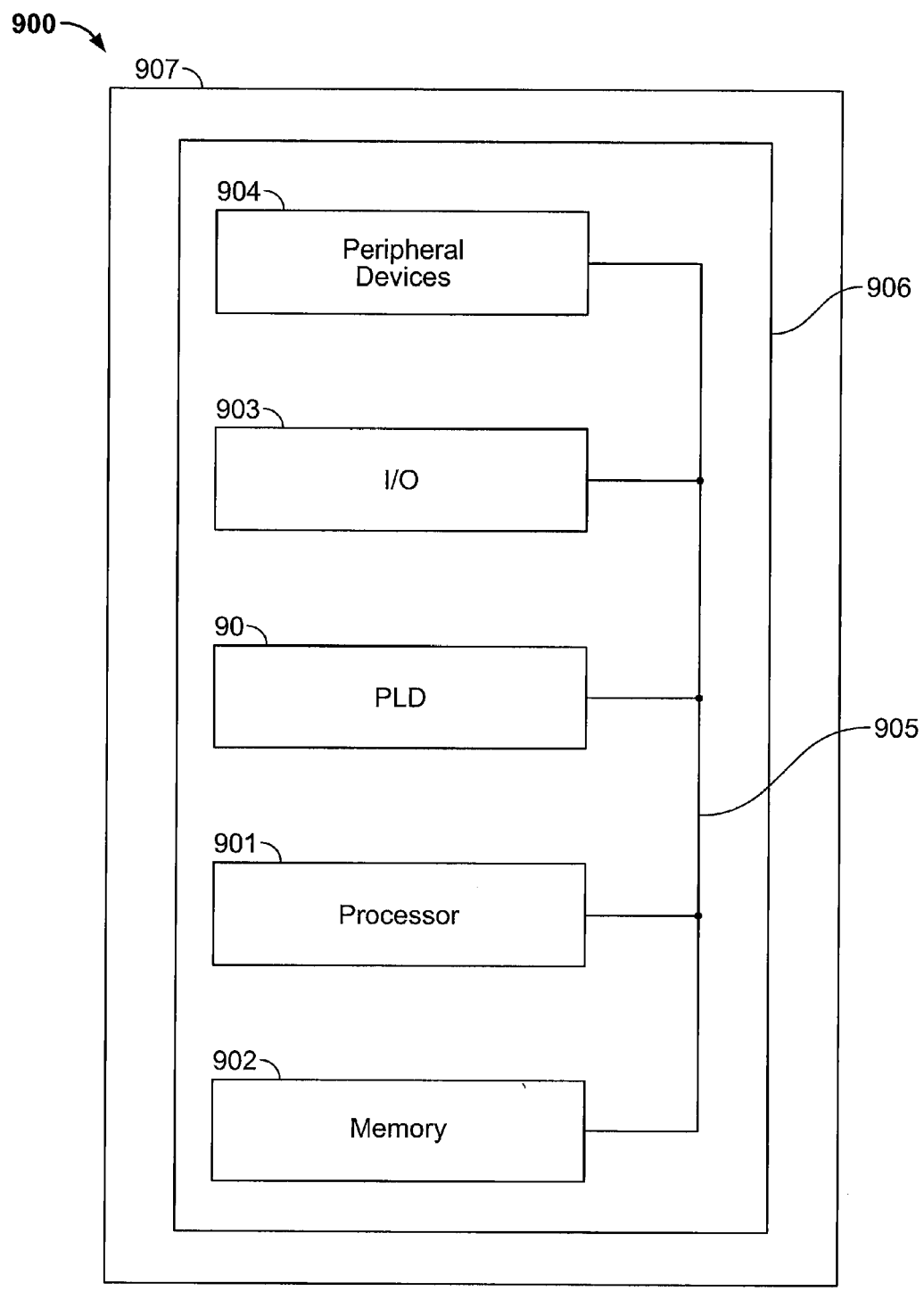
FIG. 4 is a simplified block diagram of an illustrative system employing a programmable logic device incorporating the present invention.

A PLD 90 programmed according to the present invention may be used in many kinds of electronic devices. One possible use is in a data processing system 900 shown in FIG. 4. Data processing system 900 may include one or more of the following components: a processor 901; memory 902; I/O circuitry 903; and peripheral devices 904. These components are coupled together by a system bus 905 and are populated on a circuit board 906 which is contained in an end-user system 907.

System 900 can be used in a wide variety of applications, such as computer networking, data networking, instrumentation, video processing, digital signal processing, or any other application where the advantage of using programmable or reprogrammable logic is desirable. PLD 90 can be used to perform a variety of different logic functions. For example, PLD 90 can be configured as a processor or controller that works in cooperation with processor 901. PLD 90 may also be used as an arbiter for arbitrating access to a shared resources in system 900. In yet another example, PLD 90 can be configured as an interface between processor 901 and one of the other components in system 900. It should be noted that system 900 is only exemplary, and that the true scope and spirit of the invention should be indicated by the following claims.

Various technologies can be used to implement PLDs 90 as described above and incorporating this invention.

It will be understood that the foregoing is only illustrative of the principles of the invention, and that various modifications can be made by those skilled in the art without departing from the scope and spirit of the invention. For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. Circuitry for performing QR decomposition of an input matrix, said circuitry comprising:
    a first datapath for performing multiplication and addition operations on columns of said input matrix, said first datapath comprising a plurality of multipliers, a corresponding plurality of adders each having an input connected to an output of one of said multipliers, and a summer having inputs connected to said outputs of said multipliers; and
    a second datapath for performing an inverse square root operation and multiplication operations on output of said summer of said first datapath and on said inverse square root operation; wherein:
    on a first pass, said first datapath computes respective inner products of one column of said input matrix with each column of said input matrix, and said second datapath computes an inverse norm of said first column, and multiplies a square of said inverse norm by respective inner products of said one column with each other column of said input matrix to form respective norm combinations; and
    on a second pass, said adders of said first datapath compute a respective difference between each said other column and a product of said one column and a respective one of said norm combinations.

2. The circuitry of claim 1 further comprising:
    a first input memory for said input matrix; wherein:
    output of said adders on said second pass are written into said first input memory to modify said input matrix in said first input memory as an orthogonal matrix in QR decomposition of said input matrix.

3. The circuitry of claim 2 further comprising:
    a second input memory for said input matrix; wherein:
    after said second pass, said first datapath multiplies said input matrix in said second input memory by a transpose of said orthogonal matrix in said first input memory.

4. The circuitry of claim 3 wherein:
    each of said first and second input memories comprises a plurality of row memories; and
    columns of a respective matrix in one of said first and second input memories are read by reading corresponding elements from each row memory in said respective one of said first and second input memories.

5. The circuitry of claim 4 wherein rows of said transpose of said orthogonal matrix are read by reading columns of said orthogonal matrix.

6. The circuitry of claim 1 further comprising multiplexer circuitry for selecting inputs for said first datapath on said first and second passes.

7. The circuitry of claim 1 further comprising storage for latching an inner product of said one column with itself at an input to said inverse square root operation.

8. The circuitry of claim 1 further comprising storage for latching said first column at an input to said first datapath.

9. A method of configuring a programmable integrated circuit device as circuitry for performing QR decomposition of an input matrix, said method comprising:
    configuring logic of said programmable integrated circuit device as a first datapath for performing multiplication and addition operations on columns of said input matrix, said first datapath comprising a plurality of multipliers, a corresponding plurality of adders each having an input connected to an output of one of said multipliers, and a summer having inputs connected to said outputs of said multipliers; and
    configuring logic of said programmable integrated circuit device as a second datapath for performing inverse square root operation and multiplication operation on output of said summer of said first datapath; wherein:
    on a first pass, said first datapath computes respective inner products of one column of said input matrix with each column of said input matrix, and said second datapath computes an inverse norm of said first column, and multiplies a square of said inverse norm of said first column by respective inner products of said one column with each other column of said input matrix to form respective norm combinations; and on a second pass, said adders of said first datapath compute a respective difference between each said other column and a product of said one column and a respective one of said norm combinations.

10. The method of claim 9 further comprising:
configuring a first input memory for said input matrix; and
configuring output of said adders for writing on said second pass into said first input memory to modify said input matrix in said first input memory as an orthogonal matrix in QR decomposition of said input matrix.

11. The method of claim 10 further comprising:
configuring a second input memory for said input matrix; and
configuring said first datapath to multiply, after said second pass, said input matrix in said second input memory by a transpose of said orthogonal matrix in said first input memory.

12. The method of claim 11 comprising:
configuring each of said first and second input memories as a plurality of row memories; wherein:
columns of a respective matrix in one of said first and second input memories are read by reading corresponding elements from each row memory in said respective one of said first and second input memories.

13. The method of claim 9 further comprising configuring multiplexer circuitry for selecting inputs for said first datapath on said first and second passes.

14. The method of claim 9 further comprising configuring storage for latching an inner product of said one column with itself at an input to said inverse square root operation.

15. The method of claim 9 further comprising configuring storage for latching said first column at an input to said first datapath.

16. A programmable integrated circuit device comprising:
logic configurable as a first datapath for performing multiplication and addition operations on columns of said input matrix, said first datapath comprising a plurality of multipliers, a corresponding plurality of adders each having an input connected to an output of one of said multipliers, and a summer having inputs connected to said outputs of said multipliers; and
logic configurable as a second datapath for performing inverse square root operation and multiplication operation on output of said summer of said first datapath; wherein, when said logic configurable as a first datapath and said logic configurable as a second datapath are configured, respectively, as said first and second datapath:
on a first pass, said first datapath computes respective inner products of one column of said input matrix with each column of said input matrix, and said second datapath computes an inverse norm of said first column, and multiplies a square of said inverse norm of said first column by respective inner products of said one column with each other column of said input matrix to form respective norm combinations; and
on a second pass, said adders of said first datapath compute a respective difference between each said other column and a product of said one column and a respective one of said norm combinations.

17. The programmable integrated circuit device of claim 16 further comprising:
memory configurable as a first input memory for said input matrix; and
logic configurable to write output of said adders on said second pass into said first input memory to modify said input matrix in said first input memory as an orthogonal matrix in QR decomposition of said input matrix.

18. The programmable integrated circuit device of claim 17 further comprising:
memory configurable as a second input memory for said input matrix; wherein:
said first datapath is configurable to multiply, after said second pass, said input matrix in said second input memory by a transpose of said orthogonal matrix in said first input memory.

19. The programmable integrated circuit device of claim 18 comprising:
a plurality of row memories configurable as rows of each of said first and second input memories; wherein:
columns of a respective matrix in one of said first and second input memories are read by reading corresponding elements from each row memory in said respective one of said first and second input memories.

20. The programmable integrated circuit device of claim 16 further comprising multiplexer circuitry configurable for selecting inputs for said first datapath on said first and second passes.

21. The programmable integrated circuit device of claim 16 further comprising storage configurable for latching an inner product of said one column with itself at an input to said inverse square root operation.

22. The programmable integrated circuit device of claim 16 further comprising storage configurable for latching said first column at an input to said first datapath.

23. A machine-readable data storage medium encoded with machine-executable instructions for configuring a programmable integrated circuit device as circuitry for performing QR decomposition of an input matrix, said instructions comprising:
instructions to configure logic of said programmable integrated circuit device as a first datapath for performing multiplication and addition operations on columns of said input matrix, said first datapath comprising a plurality of multipliers, a corresponding plurality of adders each having an input connected to an output of one of said multipliers, and a summer having inputs connected to said outputs of said multipliers; and
instructions to configure logic of said programmable integrated circuit device as a second datapath for performing inverse square root operation and multiplication operation on output of said summer of said first datapath; wherein:
on a first pass, said first datapath computes respective inner products of one column of said input matrix with each column of said input matrix, and said second datapath computes an inverse norm of said first column and multiplies said inverse norm of said first column by respective inner products of said one column with each other column of said input matrix to form respective norm combinations; and
on a second pass, said adders of said first datapath compute a respective difference between each said other column and a product of said one column and a respective one of said norm combinations.

24. The machine-readable data storage medium of claim 23 further comprising:
instructions to configure a first input memory for said input matrix; and instructions to configure output of said adders for writing on said second pass into said first input memory to modify said input matrix in said first input memory as an orthogonal matrix in QR decomposition of said input matrix.

25. The machine-readable data storage medium of claim 24 further comprising:
instructions to configure a second input memory for said input matrix; and
instructions to configure said first datapath to multiply, after said second pass, said input matrix in said second input memory by a transpose of said orthogonal matrix in said first input memory.

26. The machine-readable data storage medium of claim 25 comprising:
instructions to configure each of said first and second input memories as a plurality of row memories; wherein:
columns of a respective matrix in one of said first and second input memories are read by reading corresponding elements from each row memory in said respective one of said first and second input memories.

27. The machine-readable data storage medium of claim 23 further comprising instructions to configure multiplexer circuitry for selecting inputs for said first datapath on said first and second passes.

28. The machine-readable data storage medium of claim 23 further comprising instructions to configure storage for latching an inner product of said one column with itself at an input to said inverse square root operation.

29. The machine-readable data storage medium of claim 23 further comprising instructions to configure storage for latching an inverse norm of said one column at an input to said first datapath.

* * * * *

UNITED STATES PATENT AND TRADEMARK OFFICE
CERTIFICATE OF CORRECTION

| | | |
|---|---|---|
| PATENT NO. | : 8,539,016 B1 | Page 1 of 1 |
| APPLICATION NO. | : 12/703146 | |
| DATED | : September 17, 2013 | |
| INVENTOR(S) | : Langhammer | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 650 days.

Signed and Sealed this
Seventeenth Day of February, 2015

Michelle K. Lee
*Deputy Director of the United States Patent and Trademark Office*